(12) United States Patent
Farmanbar

(10) Patent No.: US 10,212,100 B2
(45) Date of Patent: Feb. 19, 2019

(54) SYSTEM AND METHOD FOR DATA TRANSMISSION IN UPLINK RAN

(71) Applicant: Hamidreza Farmanbar, Ottawa (CA)

(72) Inventor: Hamidreza Farmanbar, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 51 days.

(21) Appl. No.: 15/276,146

(22) Filed: Sep. 26, 2016

(65) Prior Publication Data
US 2018/0091441 A1 Mar. 29, 2018

(51) Int. Cl.
H04W 72/04 (2009.01)
H04L 12/911 (2013.01)
H04L 12/26 (2006.01)
H04W 28/22 (2009.01)

(52) U.S. Cl.
CPC ........ *H04L 47/827* (2013.01); *H04L 43/0894* (2013.01); *H04L 47/822* (2013.01); *H04W 28/22* (2013.01); *H04W 72/04* (2013.01)

(58) Field of Classification Search
CPC . H04L 47/827; H04L 43/0894; H04L 47/822; H04W 72/04
See application file for complete search history.

(56) References Cited

U.S. PATENT DOCUMENTS

| 2007/0274228 A1 | 11/2007 | Nandagopalan et al. | |
| 2011/0310735 A1* | 12/2011 | Karagiannis | H04L 43/045 370/232 |
| 2015/0079945 A1* | 3/2015 | Rubin | H04W 12/08 455/411 |
| 2015/0282195 A1* | 10/2015 | Farhadi | H04W 72/085 370/229 |
| 2017/0086049 A1* | 3/2017 | Vrzic | H04L 67/327 |
| 2017/0367002 A1* | 12/2017 | Rubin | G06F 11/00 |

FOREIGN PATENT DOCUMENTS

| CN | 103384395 A | 11/2013 |
| CN | 104717717 A | 6/2015 |
| CN | 104811290 A | 7/2015 |
| CN | 105406978 A | 3/2016 |

OTHER PUBLICATIONS

International Search Report dated Oct. 19, 2017 for corresponding International Application No. PCT/CN2017/094125 filed Jul. 24, 2017.

* cited by examiner

*Primary Examiner* — Jay P Patel

(57) ABSTRACT

A method includes iteratively executing, by a computer, a scheduling process computing an allocation of wireless access network data rate to each link between an Access point and a User Equipment within a coverage area of the Access Point, and a routing process computing an allocation of wired network resources to each wired link between the Access Point and nodes of a wired network. The scheduling and routing processes are independent of each other. At each iteration, information of the allocated wireless access network data rate is passed to the routing process; and information of the aggregate allocated data rate for each service at the Access Point is passed to the scheduling process.

16 Claims, 4 Drawing Sheets

SYSTEM AND METHOD FOR DATA TRANSMISSION IN UPLINK RAN

CROSS-REFERENCE TO RELATED APPLICATIONS

This is the first application filed in respect of the present invention.

TECHNICAL FIELD

The present disclosure relates to radio access networks, and in particular to a System and Method for Data Transmission in Uplink RAN.

BACKGROUND

A conventional radio access network (RAN) is configured to provide connectivity between User Equipment (UE) such as mobile communication devices and a packet data network that provides end-to-end communications services. FIG. 1 schematically illustrates a conventional radio access network (RAN). As may be seen in FIG. 1, the RAN 2 comprises a plurality of radio Access Points (APs) 4 that are connected to one or more Packet Data Network Gateways (PGWs) 6 through a wired network 8. In some cases, the wired network 8 may rely on legacy copper cables for connections between nodes. However, increasingly, connections between nodes of the wired network 8 are set up through optical fiber links. The APs 4 include radio transceiver equipment for maintaining wireless connections with the UEs 10, and signal routing equipment for forwarding signals through the wired network 8 to the PGWs 6. Each PGW 6 provides a link between the RAN 2 and the packet data network 12, and so enables traffic flows between the packet data network 12 and UEs 10. It is common to refer to the wired portion of the RAN 2, including the wired network 8, PGWs 6, and the wired links between the APs 4 and the wired network 8 as the "backhaul" network, and to refer to the wireless portion of the of the RAN 2, including the UEs 10, radio equipment of the APs 4, and the wireless links between the UEs 10 and the APs 4 as the Wireless Access network.

Typically, these traffic flows are associated with specific services of the packet data network 12 and/or the RAN 2. As is known in the art, a service of the packet data network 12 will involve a downlink traffic flow from one or more of the PGWs 6 to a UE 10, and an uplink traffic flow from the UE 10 to the involved PGWs 6. Similarly, a service of the RAN will involve a downlink traffic flow from one or more servers 14 of the wired network 8 to a UE 10, and an uplink traffic flow from the UE 10 to the involved servers 14. In both cases, optimization of the uplink traffic flows involves optimization of both the wireless link between the UE 10 and one or more host APs 4, and the wired links through the wired network 8 from these host APs 4 to the involved PGWs 6 or servers 14 of the wired network 8.

Optimization of the wireless link typically implies scheduling data transmission from the UE 10 to its host AP(s) 4 according to an objective which usually is a function of the UEs' transmission rates.

Optimization of the wired link through the wired network 8 typically implies finding an optimal routing through the wired network 8 from the APs 4 to the appropriate servers 14 or PGW(s) 6. In some cases, the traffic flows associated with a given network service must be routed through a specific user plane function path. A user plane function path is a sequence of one or more function nodes that the traffic flows must go through. For example, a given service may be associated with one or more Service Gateway (SGW) nodes within the RAN, and traffic flows associated with that service must be routed to those SGWs. Additionally, some services have specific quality of service (QoS) requirements that specify limits on traffic latency, for example. The routing algorithm must accommodate these requirements.

Typically, scheduling and routing optimization are treated as separate problems that are solved using independent algorithms. While this approach is efficient, and leads to optimization of each of the wireless and wired links, in some cases the combined path including both the wireless and wired links is still sub-optimal.

Accordingly, it would be desirable to be able to efficiently optimize the combined wireless and wired paths from the UE

SUMMARY

Accordingly, an aspect of the present invention provides a method comprising: iteratively executing, by a computer, a scheduling process computing an allocation of data rate to each wireless link between an Access point and a User Equipment within a coverage area of the Access Point, and a routing process computing an allocation of data rate to each wired link between nodes of a wired network, the scheduling and routing processes being independent of each other; at each iteration, passing, information of the data rates allocated to wireless links to the routing process, such that the routing process computes the allocation of data rates to each wired link using the information of the data rates allocated to wireless links; and at each iteration, passing information of the aggregate data rate allocated for each service at the Access Point to the scheduling process, such that the scheduling process calculates the allocation of data rates to wireless links using the aggregate data rate allocated for each service at the Access Point.

An advantage of the present invention is that information about wired network capacity and wireless service demand is exchanged between the routing and scheduling processes. Thus in accordance with the present disclosure, the wireless network scheduling problem is solved using information of wired network aggregate capacity, and the wired network routing problem is solved using information of service data rate distribution across the wireless access network.

BRIEF DESCRIPTION OF THE DRAWINGS

Features and advantages of the present invention will become apparent from the following detailed description, taken in combination with the appended drawings, in which.

It will be noted that throughout the drawings, like elements are identified by like reference numerals.

DETAILED DESCRIPTION

Figure 1:
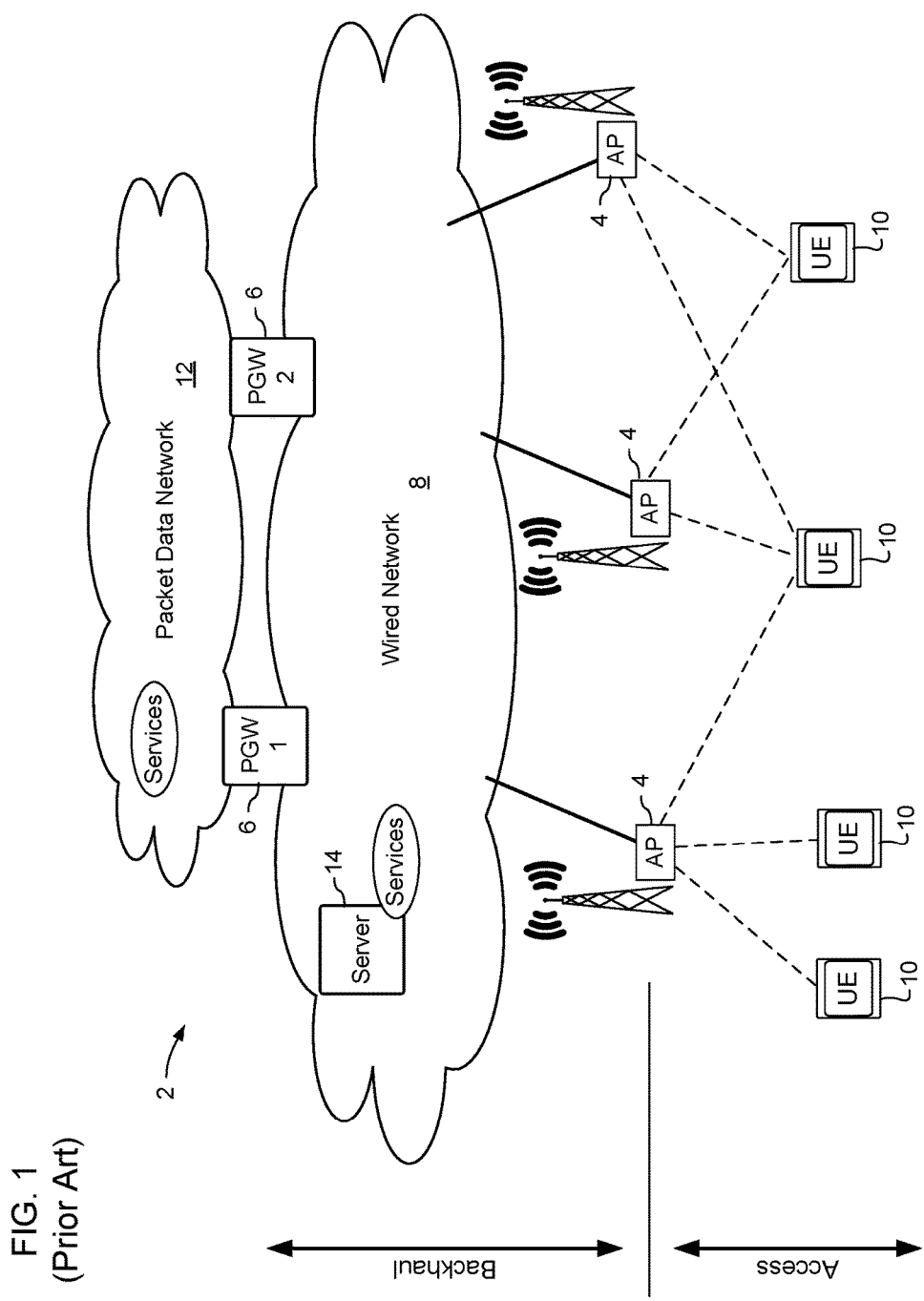
FIG. 1 is a block diagram schematically illustrating principal elements of a conventional radio access network (RAN)

Augmented Lagrangian methods are a class of algorithms known in the art for solving constrained optimization problems. In a general example, let us say we are solving the following constrained problem:

min $f(x)$, subject to the constraint: $c_i(x)=0$ $\forall i \in I$

In this disclosure, the operators "$\forall$" and "$\in$" are used to mean "for all" and "in", respectively. Thus the term "$\forall i \in I$" means "for all i in I". In this formulation, I is the set of constraints $c(x)$, and i is an index of each constraint within the set.

As is known in the art, this constrained problem can be solved as a series of unconstrained problems. The augmented Lagrangian method solves this problem iteratively, using the following unconstrained objective function:

$$\Phi_k(x) = f(x) + \frac{\mu_k}{2}\sum_{i \in I} c_i^2 - \sum_{i \in I} \lambda_i c_i$$

Where k is an index identifying each iteration step. In each step, this objective function is solved, and the variables $\mu_k$ and $\lambda_k$ are updated for the next iteration. Typically, that value of $\mu_k$ is increased for each iteration, while the value of $\lambda_k$ is updated according to the rule:

$$\lambda_{k+1} = \lambda_k - \mu_k c_i(x_k)$$

Where $x_k$ where is the solution to the unconstrained objective function at the kth step, i.e. $x_k$=argmin $\Phi_k(x)$.

The variable $\lambda$ is an estimate of the Lagrange multiplier, and the accuracy of this estimate improves at every step.

The Alternating Direction Method of Multipliers (ADMM) is a variant of the augmented Lagrangian scheme described above, that uses partial updates for the dual variables $\mu_k$ and $\lambda_k$. This method is known in the art for solving problems of the form:

This problem is equivalent to the constrained problem:

$$\min_{x,y}[f(x)+g(y)] \text{ subject to the constraint: } x=y$$

This constrained problem can be solved using methods of constrained optimization (in particular, the augmented Lagrangian method), and the objective function is separable in x and y. The dual update requires solving a proximity function in x and y at the same time; the ADMM technique allows this problem to be solved approximately by first solving for x with y fixed, and then solving for y with x fixed. Rather than iterate until convergence, the algorithm proceeds directly to updating the dual variables x and y for the next iteration. While this is not equivalent to the original minimization problem, it can still be shown that this method can converge to the correct solution.

The present disclosure provides methods and systems for optimizing the uplink path through a Radio Access Network using an ADMM technique. The problem of optimizing the uplink path may thus be formulated as:

$$\min_{\underline{x},\underline{y}}[f(\underline{x})+g(\underline{r},\underline{y})], \text{ subject to one or more constraints}$$

In this formulation, $\underline{x}$ represents the vector of allocated (or scheduled) wireless access data rates (e.g bits-per-second) for each service for each UE, from each AP; $\underline{r}$ represents the vector of aggregate service demand at each AP; and $\underline{y}$ represents the vector of allocated service data rates on wired links.

It is convenient to identify each allocated or scheduled wireless link data rate for each service, for each UE, and for each AP, as $x_{u,n}^s$, where s is an index identifying a given service; u is an index identifying a given UE, and n is an index identifying a given AP. Put another way, for each service (identified by index "s") being used by a given UE (identified by index "u"), there is a respective wireless link to one or more APs (identified by index "n"). The value of $x_{u,n}^s$ represents the data rate (e.g. in bits per second) allocated or scheduled to each such wireless link. In this case, the vector $\underline{x}$ represents a vector of these allocations or scheduled link data rates: $x_{u,n}^s$ ($\forall u \in U$, $s \in S$, $n \in N_1$), where U is the set of all UEs, S is the set of all services, and $N_1$ is the set of all APs.

Similarly, for each AP it is convenient to identify an aggregate demand for each service as $r_n^s$. This value represents the total data rate allocated to (or required by) a given service at a given AP. In this case, the vector $\underline{r}$ represents a vector of these service demands: $r_n^s$ ($\forall s \in S$, $n \in N_1$). If desired, the aggregate demand for each service $r_n^s$ for each AP may be computed as part of the scheduling process, but this is not essential. In an alternative arrangement, the aggregate demand for each service $r_n^s$ for any given AP may be directly measured by that AP using metrics already available to the AP.

Finally, for each link of the wired network, it is convenient to identify the link data rate allocated to each service as $y_a^s$, where a is an index identifying a given link in the wired network. In this case, the vector $\underline{y}$ represents a vector of these service allocations: $y_a^s$ ($\forall s \in S$, $a \in A$), where A is the set of all links in the wired network.

Following the above notation, it will be appreciated that the function $f(\underline{x})$ is an objective function associated with the wireless links of the Access network connecting the UEs and the APs, while the function $g(\underline{r}, \underline{y})$ is an objective function associated with the wired links of the Backhaul network connecting the APs to the PGWs.

In accordance with ADMM, the objective function $\min_{\underline{x}, \underline{y}}[f(\underline{x})+g(\underline{r}, \underline{y})]$ is subject to a set of constraints. In a representative embodiment, these constraints may be formulated as follows:

Constraint 1: $\underline{x} \in X$, where X is the capacity region of the wireless network. This constraint effectively means that the vector $\underline{x}$ of allocated (or scheduled) wireless access capacity is encompassed by the total capacity of the wireless access network.

Constraint 2: $\sum_{n \in N_1} x_{u,n}^s \leq d_u^s$, $\forall s \in S$, $u \in U$, where $d_u^s$, represents the demand (or data rate requirement) for service s at UE u. This constraint effectively means that the total data rate allocated by the APs for each service and each UE is less than or equal to the data rate required by a given UE for a given service. This is equivalent to a requirement that a UE may be set up wireless links more than one APs in order to satisfy its data rate requirement for a given service.

Constraint 3: $\sum_{u \in U} x_{u,n}^s = r_n^s$, $\forall s \in S$, $n \in N_1$. This constraint effectively means that the aggregate data rate allocated by each AP for a given service, across all of the UEs hosted by that AP, is equal to the aggregate demand for that service $r_n^s$, at that AP.

Constraint 4:

$$\sum_{a \in A_{in}(n)} y_a^s - \sum_{a \in A_{out}(n)} y_a^s = \begin{cases} 0, & n \notin N_1, n \notin SGW^s \\ -r_n^s, & n \in N_1 \\ \sum_{n \in N} r_n^s, & n = SGW^s, \forall s \in S, n \in N \end{cases}$$

Where $N_2$ is the set of all routers in the wired network, N is the set of all nodes in the wired network (thus: $N=N_1 \cup N_2$), and $SGW^s$ identifies an SGW that is allocated for handling a given service "s". This constraint effectively means that:

For each network node other than an AP or an SGW designated for handling a given service, the total data rate allocated to that service on inbound wired links ($\Sigma_{a \in A_{in}(n)} y_a^s$) equals the total data rate allocated to that service on outbound wired links ($\Sigma_{a \in A_{out}(n)} y_a^s$). This constraint is equivalent to a requirement that routers of the backhaul network will operate to forward all of the traffic received through a link from another node of the network;

For each AP of the network, the difference between the total data rate allocated to a given service on inbound wired links ($\Sigma_{a \in A_{in}(n)} y_a^s$) and the total data rate allocated to that service on outbound wired links ($\Sigma_{a \in A_{out}(n)} y_a^s$), is equal to the aggregate demand for that service $r_n^s$ by UEs hosted by that AP. This constraint implies that an AP may operate as both an AP hosting UEs within its own coverage area, and a router of the backhaul network forwarding traffic from another node; and For each SGW designated for handling a given service, the difference between the total data rate allocated to that service on inbound wired links ($\Sigma_{a \in A_{in}(n)} y_a^s$) and the total data rate allocated to that service on outbound wired links ($\Sigma_{a \in A_{out}(n)} y_a^s$), is equal to the total, calculated across all of the APs, of the aggregate demand for that service $r_n^s$ by UEs hosted by each of the AP. This constraint is equivalent to a requirement that all of the traffic flows (from all of the involved UEs, and via any of the involved APs) associated with a given service are routed to a single SGW designated to handle that service. It will be appreciated that, if desired, this constraint may be reformulated to require that the traffic flows associated with a given service are routed to more than one SGW designated to handle that service. Further constraint may be formulated as desired, for example to require that the traffic flows associated with a given service are routed to a predetermined set of SGWs, with a predetermined proportion of the traffic flows being routed to each SGW within that set, for example, or to require that the traffic flows are routed to each SGW in a predetermined order or sequence. In a further example, constraints may be formulated to require that traffic flows associated with a given service must be routed through a predetermined sequence of User Packet Function (UPF) nodes within the back-haul network.

Constraint 5: $\Sigma_{s \in S} y_a^s \leq c_a$, $\forall s \in S$, $n \in N$, where $c_a$ represents the total capacity of a given wired link. This constraint effectively means that the total data rate allocated to all services on any given link is less than or equal to the total capacity of that link. In this respect, the total capacity $c_a$ of a given link may be taken as the advertised capacity of that link for carrying subscriber traffic, and so does not include In many cases, the advertised capacity of a link will reflect that actual capacity of the link, less any portion of the total link capacity allocated to protection and overhead. However, it will be appreciated that, if desired, the advertised capacity $c_a$ of a given link may be adjusted based on any desired criteria. For example, the advertised capacity $c_a$ of a given link may be reduced in order to force traffic flows onto other links, or increased in order to attract traffic flows away from other links.

Following the above discussion, it will be appreciated that Constraints 1 and 2 directly or indirectly relate to the wireless access network, and so may be considered to be wireless constraints, while constraints 4 and 5 relate to the wired backhaul network, and so may be considered to be backhaul constraints. On the other hand, constraint 3 relates to both of the wireless access and wired backhaul networks, and so may be considered to be a linking constraint.

Based on the foregoing, the objective function $\min_{x,y}[f(\underline{x}) + g(\underline{r}, \underline{y})]$, subject to constraints 1-5 above, can be decomposed into a Scheduling Sub-problem of the form:

$$\min_x f(x) + \sum_n \sum_s \delta_n^s(t)\left(r_n^s(t) - \sum_u x_{u,n}^s\right) + \frac{\rho}{2} \sum_n \sum_s \left(r_n^s(t) - \sum_u x_{u,n}^s\right)^2$$

Subject to constraints 1 and 2.
And a Routing Sub-problem of the form:

$$\min_{r,y} g(\underline{r}, \underline{y}) + \sum_n \sum_s \delta_n^s(t)\left(r_n^s - \sum_u x_{u,n}^s(t+1)\right) +$$

$$\frac{\rho}{2} \sum_n \sum_s \left(r_n^s - \sum_u x_{u,n}^s(t+1)\right)^2$$

Subject to constraints 4 and 5.
With a dual-variable update of the form:

$$\delta_n^s(t+1) = \delta_n^s(t) + \rho(r_n^s(t+1) - \Sigma_u x_{u,n}^s(t+1)), \forall s \in S, n \in N$$

Examination of the example Scheduling and Routing sub-problems formulated above reveals the linking constraint $\Sigma_{u \in U} x_{u,n}^s = r_n^s$, $\forall s \in S$, $n \in N_1$ appears within the Scheduling sub-problem via the term $r_n^s(t)$, and in the Routing sub-problem via the term $\Sigma_u x_{u,n}^s(t+1)$. In effect, the routing sub-problem is solved including knowledge of the aggregate service demand in the wireless access network, and the Scheduling sub-problem is solved including knowledge of the aggregate link capacities in the wired backhaul network. This contrasts with prior art methods, in which the scheduling and routing problems are solved independently, with no knowledge of each other. That is, in the prior art methods, the scheduling problem is solved under the assumption that the aggregate capacity in the wired backhaul network is effectively infinite, and the routing problem is solved without considering service demand distribution across the wireless access network The present disclosure improves over the prior art by exchanging information about wired network capacity and wireless service demand between the routing and scheduling processes. Thus in accordance with the present disclosure, the wireless network scheduling problem is solved using information of wired network aggregate capacity, and the wired network routing problem is solved using information of service data rate distribution across the wireless access network.

Figure 2:
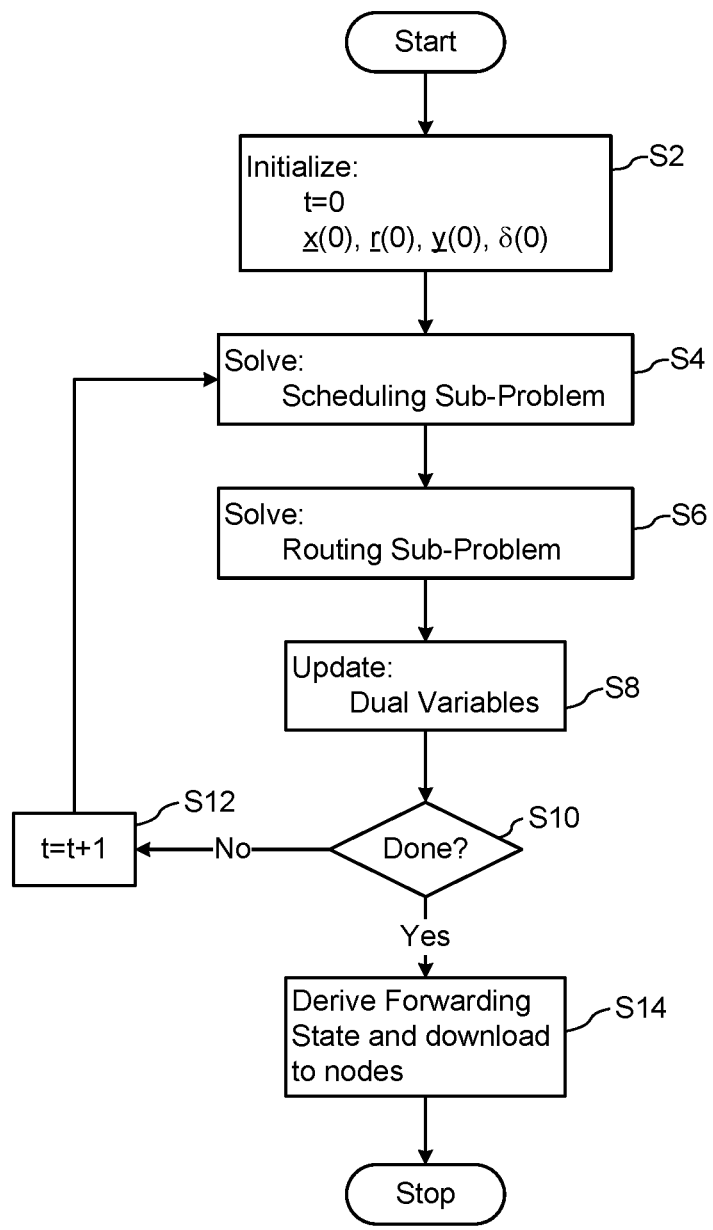
FIG. 2 is a flowchart illustrating principal steps in a representative method in accordance with the present invention.

FIG. 2 is a flow-chart illustrating a representative process for solving the Scheduling and Routing sub-problems described above. Processes in accordance with the present invention may be executed by a general purpose computer under the control of software instructions saved on a non-transitory computer readable media. Such a computer may be implemented as a centralized network management computer, a predetermined server within the network, or even one of the APs, if desired. Alternatively, processes in accordance with the present invention may be implemented in a distributed computing model. For example, in will be noted that each AP is able to measure local values of the vectors $\underline{x}$ and $\underline{r}$ for those wireless links and UEs that are connected to it. Accordingly, each AP is capable of computing solutions of the Scheduling and Routing sub-problems, that pertain to the links and UEs that are connected to it that AP. Alternatively, each AP may be controlled to pass its locally measured values of the vectors $\underline{x}$ and $\underline{r}$ to a central computer which computes "global" solutions for the Scheduling and Routing sub-problems. In a still further alternative, a scheduling process may be executed to solve the Scheduling sub-problem, and a routing process ma be executed to solve the Routing sub-problem. These processes may be executed on one or more computers. For example, the scheduling process may be executed on a first computer, and the routing process may be executed on a second computer. These two computers may operate independently of each other, and may be geographically distant from each other. In some cases, the first computer may correspond with one or more APs, in which case the "first computer" may in fact be embodied as two or more separate computers (APs) that are themselves geographically distributed across the network.

In the example process of FIG. 2, at a first step (at S2), the vectors $\underline{x}$, $\underline{r}$ and $\underline{y}$ are initialed, for all values of $n \in N$, $s \in S$ and $u \in U$, for the first iteration (t=0). The initial value may be arbitrarily selected according to any desired criteria. For example, each value of $\underline{x}(t=0)$, $\underline{r}(t=0)$, and $\underline{y}(t=0)$ may be arbitrarily assigned a value of "0" or "1", or any other value. In an example, embodiment, at least one of the vectors may be assigned a random initial value.

Next (at S4), a Scheduling process executes to solve the Scheduling Sub-problem:

$$\min_{\underline{x}} f(\underline{x}) + \sum_n \sum_s \delta_n^s(t) \left( r_n^s(t) - \sum_u x_{u,n}^s \right) + \frac{\rho}{2} \sum_n \sum_s \left( r_n^s(t) - \sum_u x_{u,n}^s \right)^2$$

Subject to constraints 1 and 2 above. This yields updated values $x_{u,n}^s$ ($\forall u \in U$, $s \in S$, $n \in N1$ of the allocated (or scheduled) wireless access capacity for iteration (t+1). That is: $\underline{x}(t+1)$. The updated values $x_{u,n}^s$ can also be used to compute the aggregate wireless access demand for each service, for each Access Point, that is: $\Sigma_u x_{u,n}^s(t+1)$. The updated values of $\Sigma_u x_{u,n}^s(t+1)$ are passed to the Routing process and so used to solve the Routing Sub-problem.

Next (at S6), a Routing process executes to solve the Routing Sub-problem:

$$\min_{\underline{r},\underline{y}} g(\underline{r},\underline{y}) + \sum_n \sum_s \delta_n^s(t) \left( r_n^s - \sum_u x_{u,n}^s(t+1) \right) +$$

$$\frac{\rho}{2} \sum_n \sum_s \left( r_n^s - \sum_u x_{u,n}^s(t+1) \right)^2$$

Subject to constraints 4 and 5 above. This yields updated values $r_n^s$ ($\forall s \in S$, $n \in N1$ of the backhaul aggregate service demand for each AP, that is rt+1. The updated values of $r_n^s$ are passed to the scheduling process and so used to solve the Scheduling problem.

It will be appreciated that the Scheduling and Routing processes are independent of one another, so that the order in which the Scheduling and Routing sub-problems are solved is not important. FIG. 2 illustrates an example embodiment in which the Scheduling sub-problem is solved first, and then the Routing sub-problem is solved. In this case, the updated value of $\Sigma_u x_{u,n}^s$ calculated by the scheduling process can be passed to the routing process and used immediately in solving the routing problem, whereas the updated values of $r_n^s$ calculated by the routing process can be passed to the scheduling process and used for solving the scheduling problem in the next iteration. This order of operation and passing of updated $\Sigma_u x_{u,n}^s$ and $r_n^s$ values may be reversed, if desired. Alternatively, the Scheduling and Routing sub-problems may be solved simultaneously, if desired. In this latter alternative, the updated values of $\Sigma_u x_{u,n}^s$ and $r_n^s$ calculated by each process may both be used in solving the scheduling and routing sub-problems in the next iteration.

Referring back to FIG. 2, once the Scheduling and Routing sub-problems have been solved, the dual variable dual-variable $\delta_n^s(t)$ is updated (at S8) following:

$$\delta_n^s(t+1)=\delta_n^s(t)+\rho(r_n^s(t+1)-\Sigma_u x_{u,n}^s(t+1)), \forall s \in S, n \in N$$

Next (at S10), the method determines whether or not a predetermined stop criterion is satisfied. If the stop criterion is not satisfied, the process increments the step counter t (at S12), and begins another iteration by solving the Scheduling and Routing sub-problems again, using the values of $\underline{x}(t+1)$, $\underline{r}(t+1)$, and $\delta_n^s(t+1)$ calculated in the previous step. Otherwise, if the stop criterion is satisfied, then the iterative optimization process ends, and the resultant vectors $\underline{x}$, $\underline{r}$ and $\underline{y}$ used to derive (at S14) scheduling rules for each AP, and forwarding state for each router of the network. The scheduling rules and forwarding state can then be downloaded and installed in each AP and router of the network to implement the wireless scheduling and traffic forwarding needed to realize the solution obtained by the ADMM optimization process.

Any suitable stop criterion may be used to terminate the above process. For example, the stop criteria may be based on the values of either one or both of the objective functions $f(\underline{x})$ and $g(\underline{r},\underline{y})$. For example, it may be desired to terminate the process after a predetermined number of iterations, in which case the stop criterion may conveniently be based on the value of the step counter t. In another example, it may be desired to terminate the process if the change in any of the variables $\underline{x}(t+1)$, $\underline{r}(t+1)$, and $\delta_n^s(t+1)$ between successive iterations is less than a predetermined limit value. In still other examples, variables may be combined together, and/or used to calculate a value that is used as the stop criterion. For example, the vectors $\underline{x}$, $\underline{r}$ and $\underline{y}$ may be used to calculate a figure of merit indicative of a quality of the solution represented by the vectors $\underline{x}$, $\underline{r}$ and $\underline{y}$. For example, such a figure of merit may indicate a degree to which the solution represented by the vectors $\underline{x}$, $\underline{r}$ and $\underline{y}$ at any given iteration step approximates a theoretically ideal solution. Other possible stop criterial will be apparent to those of ordinary skill in the art, without departing from the intended scope of the appended claims.

The foregoing example embodiment is based on a network architecture in which the wired network is composed of three types of nodes, namely APs, routers, and SGWs. However, it will be appreciated that other types of nodes may be used, as desired, and constraints may be formulated based on the capabilities of these nodes. For example, the backhaul network may configured to include a trunking node, which is configured to forward traffic through a high-data rate trunk or tunnel to a predetermined SGW. In this case, one or more constraints may be formulated such that all of the traffic destined to the predetermined SGW must be routed though the trunking node.

Figure 3:
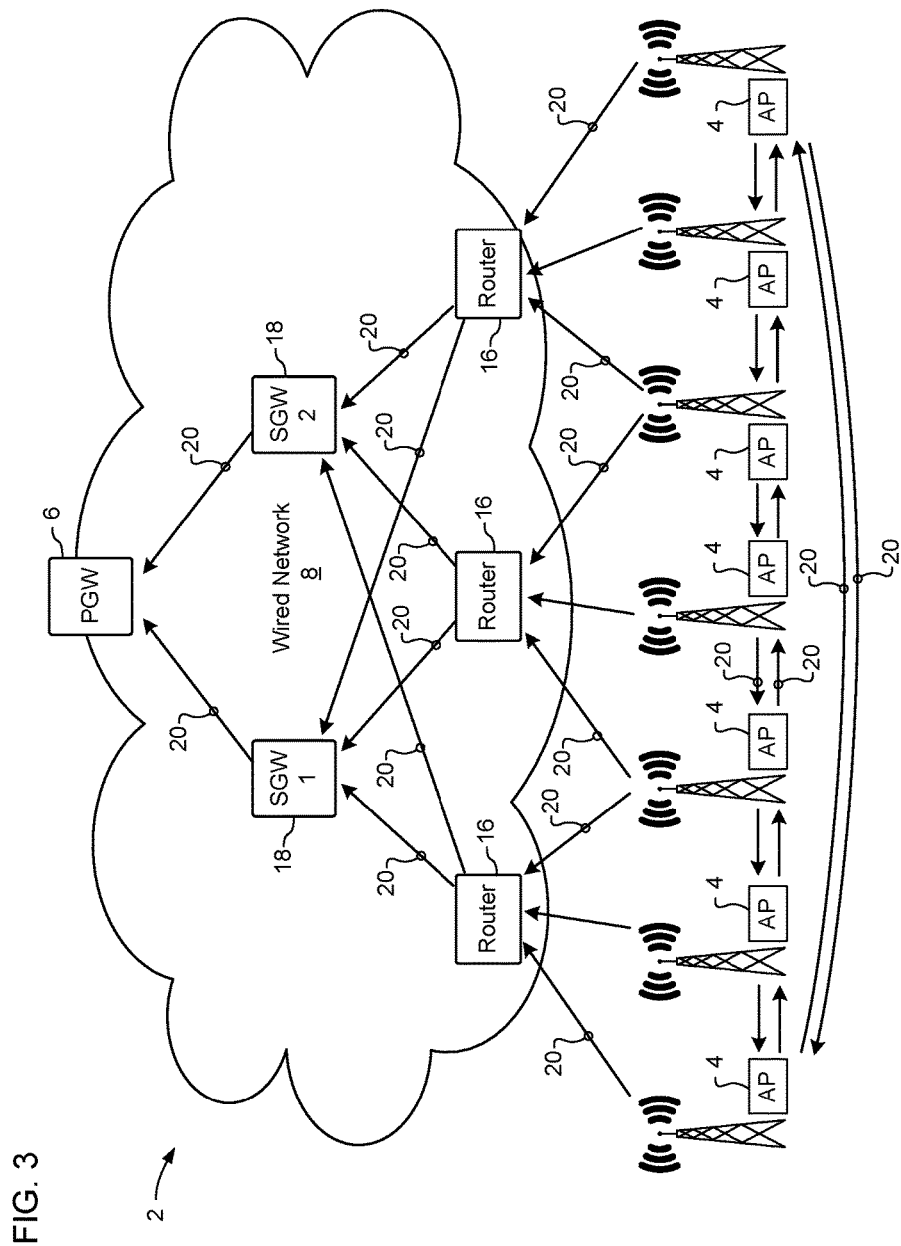
FIG. 3 is a block diagram schematically illustrating principal elements of a radio access network (RAN) in which techniques in accordance with the present invention may be implemented.
Figure 4:
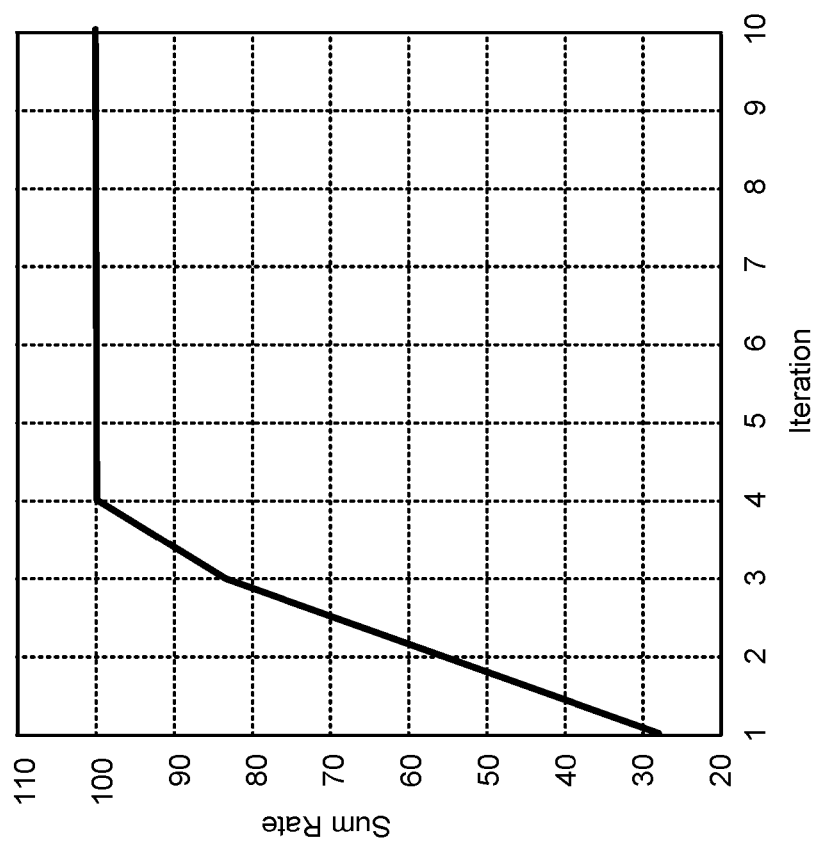
FIG. 4 is a chart showing convergence of a representative method in accordance with the present invention.

FIGS. 3 and 4 illustrate an example of uplink route computation using the method described above with reference to FIG. 2. As may be seen in FIG. 3, the example Radio Access network 2 comprises a set of seven Access Points (APs) 4, three routers 16, a pair of Service Gateways (SGWs) 18, a Packet data network Gateway (PGW) 6 and thirty-one wired links 20. Each link 20 operates in a single direction, as indicated by the arrows in FIG. 3. The Wireless Access portion of the network is assumed to include a set of 50 UEs 10 (not shown), each of which is connected to one or more of the APs 4 via corresponding wireless links (not shown). The PGW 6 provides access to the data network 12 in the manner known in the art and described above with reference to FIG. 1. In this example, each SGW 18 hosts a respective one network service, and so must receive all of the network traffic associated with that service. The routers 16 operate in a conventional manner.

For the example of FIG. 3, the Scheduling and Routing objective functions are as described above, the initial vector values of $\underline{x}(t=0)$, $\underline{r}(t=0)$ and $\underline{y}(t=0)$ are arbitrarily assigned a random value, and the stop criteria are selected as: $f(\underline{x})=\Sigma_{s,u,n}x_{u,n}^s$ and $g(\underline{r},\underline{y})=\Sigma_{s,n}r_n^s$. The chart of FIG. 4 shows the Sum Rate vs. iteration number, which shows the progression of the value of $f(\underline{x})$ for each successive iteration. For this example, the Sum Rate is computed as $$SR = \frac{f(\underline{x})}{\sum_{s,u,n} x_{u,n}^s} * 100\%$$

so that the stopping condition corresponds with a Sum Rate of 100%. As may be seen in FIG. 4, this stopping condition is achieved after 4 iterations. This demonstrates that the method described above with reference to FIG. 2 will converge rapidly (in terms of the number of iteration steps) to an optimal solution.

The embodiments of the invention described above are intended to be representative only. The scope of the invention is therefore intended to be limited solely by the scope of the appended claims.

I claim:

1. A method comprising:
   executing, by at least one computer an iterative process including, in each iteration:
   a scheduling process computing an allocation of wireless access network data rate to each link between an Access point and a User Equipment within a coverage area of the Access Point, wherein the computed allocation of wireless access network data rate comprises $x_{u,n}^s$ ($\forall u \in U$, $s \in S$, $n \in N_1$), where:
   $x_{u,n}^s$ is the allocated wireless link data rate for each service, for each User Equipment and for each Access Point;
   s is an index identifying a given service; S is a set of all services; u is an index identifying a given User Equipment;
   U is a set of all User Equipment; n is an index identifying a given Access Point; and
   $N_1$ is a set of all Access Points;
   a routing process computing an allocation of wired network data rate to each wired link between nodes of a wired network;
   passing information of the computed allocation of wireless access network data rate to the routing process, such that the allocation of wired network resources to each wired link is computed using the information of the computed allocation of wireless access network data rate; and
   passing information of the computed allocation of wired network data rate for each service at the Access Point to the scheduling process, such that the allocation of wireless access network data rate to each link is computed using the information of the computed allocation of wired network data rate for each service at the Access Point.

2. The method as claimed in claim 1, wherein the scheduling process is executed by a first computer and the routing process is executed by a second computer different from the first computer, and wherein the information of the allocated wireless access network data rate is passed by the first computer to the second computer, and the information of the aggregate allocated data rate for each service at the Access Point is passed by the second computer to the first computer.

3. The method as claimed in claim 2, wherein the first computer corresponds with the Access Point.

4. The method as claimed in claim 1, wherein the information of the computed allocation of wireless access network data rate passed to the routing process comprises an aggregate allocation of wireless access network data rate for each service, for the Access Point.

5. The method as claimed in claim 4, wherein the aggregate allocation of wireless access network data rate for each service, for the Access Point, is measured by the Access Point.

6. The method as claimed in claim 1, wherein the allocation of wired network data rate for each service computed by the routing process comprises $r_n^s$ ($\forall s \in S$, $n \in N_1$), where $r_n^s$ is the aggregate allocated data rate for each service, for each Access Point; s is an index identifying a given service; S is a set of all services; n is an index identifying a given Access Point; and N is a set of all Access Points.

7. The method as claimed in claim 1, wherein the allocation of wired network data rate to each wired link comprises an allocation of link data rate for each service.

8. The method as claimed in claim 1, wherein the scheduling and routing processes are iteratively executed until a predetermined stopping criterion is satisfied.

9. A non-transitory computer readable storage medium comprising software instructions configured to control at least one computer to perform an iterative process comprising, in each iteration:
   a scheduling process computing an allocation of wireless access network data rate to each link between an Access point and a User Equipment within a coverage area of the Access Point wherein the computed allocation of wireless access network data rate comprises $x_{u,n}^s$ ($\forall u \in U$, $s \in S$, $n \in N_1$), where:
   $x_{u,n}^s$ is the allocated wireless link data rate for each service, for each User Equipment and for each Access Point;
   s is an index identifying a given service; S is a set of all services; u is an index identifying a given User Equipment;
   U is a set of all User Equipment; n is an index identifying a given Access Point; and
   $N_1$ is a set of all Access Points;
   a routing process iteratively computing an allocation of wired network data rate to each wired link between nodes of a wired network;
   passing information of the computed allocation of wireless access network data rate to the routing process, such that the routing process computes the allocation of wired network resources to each wired link using the information of the computed allocation of wireless access network data rate; and passing information of the computed allocation of wired network data rate for each service at the Access Point to the scheduling process, such that the scheduling process computes the allocation of wireless access network data rate to each link using the information of the computed allocation of wired network data rate for each service at the Access Point.

10. The non-transitory computer readable storage medium as claimed in claim 9, wherein the scheduling process is executed by a first computer and the routing process is executed by a second computer different from the first computer, and wherein the information of the allocated wireless access network data rate is passed by the first computer to the second computer, and the information of the aggregate allocated data rate for each service at the Access Point is passed by the second computer to the first computer.

11. The non-transitory computer readable storage medium as claimed in claim 10, wherein the first computer corresponds with the Access Point.

12. The non-transitory computer readable storage medium as claimed in claim 9, wherein the information of the computed allocation of wireless access network data rate passed to the routing process comprises an aggregate allocation of wireless access network data rate for each service, for the Access Point.

13. The non-transitory computer readable storage medium as claimed in claim 12, wherein the aggregate allocation of wireless access network data rate for each service, for the Access Point, is measured by the Access Point.

14. The non-transitory computer readable storage medium as claimed in claim 9, wherein the allocation of wired network data rate for each service computed by the routing process comprises $r_n^s$ ($\forall u \in U, s \in S, n \in N_1$), where $r_n^s$ is the aggregate allocated data rate for each service, for each Access Point; s is an index identifying a given service; S is a set of all services; n is an index identifying a given Access Point; and N is a set of all Access Points.

15. The non-transitory computer readable storage medium as claimed in claim 9, wherein the allocation of wired network data rate to each wired link comprises an allocation of link data rate for each service.

16. The non-transitory computer readable storage medium as claimed in claim 9, wherein the scheduling and routing processes are iteratively executed until a predetermined stopping criterion is satisfied.

* * * * *

UNITED STATES PATENT AND TRADEMARK OFFICE
CERTIFICATE OF CORRECTION

Page 1 of 2

PATENT NO. : 10,212,100 B2
APPLICATION NO. : 15/276146
DATED : February 19, 2019
INVENTOR(S) : Hamidreza Farmanbar It is certified that error appears in the above-identified patent and that said Letters Patent is hereby corrected as shown below:

In the Specification

Column 4, Lines 60 to 65:

"$\sum_{a \in A_{in}(n)} y_a^s - \sum_{a \in A_{out}(n)} y_a^s = \begin{cases} 0, & n \notin N_1, n \in SGW^s \\ -r_n^s, & n \in N_1 \\ \sum_{n \in N} r_n^s, & n = SGW^s, \forall s \in S, n \in N \end{cases}$"

Should read:

-- $\sum_{a \in A_{in}(n)} y_a^s - \sum_{a \in A_{out}(n)} y_a^s = \begin{cases} 0, & n \notin N_1, n \neq SGW^s \\ -r_n^s, & n \in N_1 \\ \sum_{n \in N} r_n^s, & n = SGW^s, \forall s \in S, n \in N \end{cases}$ --

Column 7, Line 37:

"values $x_{u,n}^s$ ($\forall u \in U$, s$\in$S, n$\in$N1 of the allocated (or"
Should read:
-- values $x_{u,n}^s$ ($\forall u \in U, s \in S, n \in N_1$) of the allocated (or --

Column 7, Lines 57 and 58:

"values $r_n^s$ ($\forall s \in S, n \in N1$ of the backhaul aggregate service demand for each AP, that is rt+1. The updated values of $r_n^s$"
Should read:
-- values $r_n^s$ ($\forall s \in S, n \in N_1$) of the backhaul aggregate service demand for each AP, that is $r(t + 1)$. The updated values of $r_n^s$ --

In the Claims

Column 12, Line 11, Claim 14:

"process comprises $r_n^s$ ($\forall u \in U, s \in S, n \in N_1$), where $r_n^s$ is"
Should read:

Signed and Sealed this
Twelfth Day of May, 2020

Andrei Iancu
*Director of the United States Patent and Trademark Office*

CERTIFICATE OF CORRECTION (continued)
U.S. Pat. No. 10,212,100 B2

-- process comprises $r_n^s$ ($\forall s \in S, n \in N_1$), where $r_n^{\hat{s}}$ is --